(12) United States Patent
Schnurpel

(10) Patent No.: US 6,767,021 B2
(45) Date of Patent: Jul. 27, 2004

(54) TORSION-BAR RELOCATION DEVICE

(76) Inventor: Jeremiah L. Schnurpel, 2080 W. Speedway Blvd. #2130, Tucson, AZ (US) 85745

( * ) Notice: Subject to any disclaimer, the term of this patent is extended or adjusted under 35 U.S.C. 154(b) by 0 days.

(21) Appl. No.: 09/883,895

(22) Filed: Jun. 18, 2001

(65) Prior Publication Data
US 2002/0190493 A1 Dec. 19, 2002

(51) Int. Cl.$^7$ ................................................ B60G 3/12
(52) U.S. Cl. ...................... 280/124.13; 280/124.134; 280/124.137; 267/277
(58) Field of Search ................... 280/124.137, 124.134, 280/124.149, 124.151, 124.152, 124.13, 124.167, 124.166, 277; 267/273, 274

(56) References Cited

U.S. PATENT DOCUMENTS

| | | | | |
|---|---|---|---|---|
| 4,033,605 A | * | 7/1977 | Smith et al. | ................. 267/276 |
| 4,243,247 A | * | 1/1981 | Kataoka | ..................... 267/276 |
| 4,570,969 A | * | 2/1986 | Tsutsumi et al. | ..... 280/124.104 |
| 4,635,958 A | * | 1/1987 | Yonemoto | ................... 267/154 |
| 5,641,175 A | * | 6/1997 | Maeda et al. | ................ 267/273 |
| 5,685,527 A | * | 11/1997 | Harbali et al. | .............. 267/258 |
| 5,716,042 A | * | 2/1998 | Derviller | .................... 267/274 |
| 5,921,569 A | * | 7/1999 | Noutomi et al. | ............ 267/277 |
| 6,070,892 A | * | 6/2000 | Noutomi et al. | ............ 267/274 |
| 6,364,297 B1 | * | 4/2002 | Weber | ........................ 267/273 |

\* cited by examiner

*Primary Examiner*—Paul N. Dickson
*Assistant Examiner*—Toan To
(74) *Attorney, Agent, or Firm*—Antonio R. Durando; Durando Birdwell & Janke P.L.C.

(57) ABSTRACT

An accessory for coupling the A-arm of a vehicle to its torsion bar through a rigid member that relocates the relative position of the two components by a predetermined offset distance that raises the torsion bar with respect to the ground. As a result, the position of the torsion bar is elevated and the ground clearance of the vehicle's undercarriage is increased. By rigidly positioning the coupling mechanism between the A-arm and the torsion bar so that the distance of the point of attachment from the A-arm's pivot point in the frame remains substantially the same, the torsional effect of the torsion bar is retained without material change. Therefore, the safety and driving characteristics of the vehicle are not noticeably altered.

20 Claims, 6 Drawing Sheets

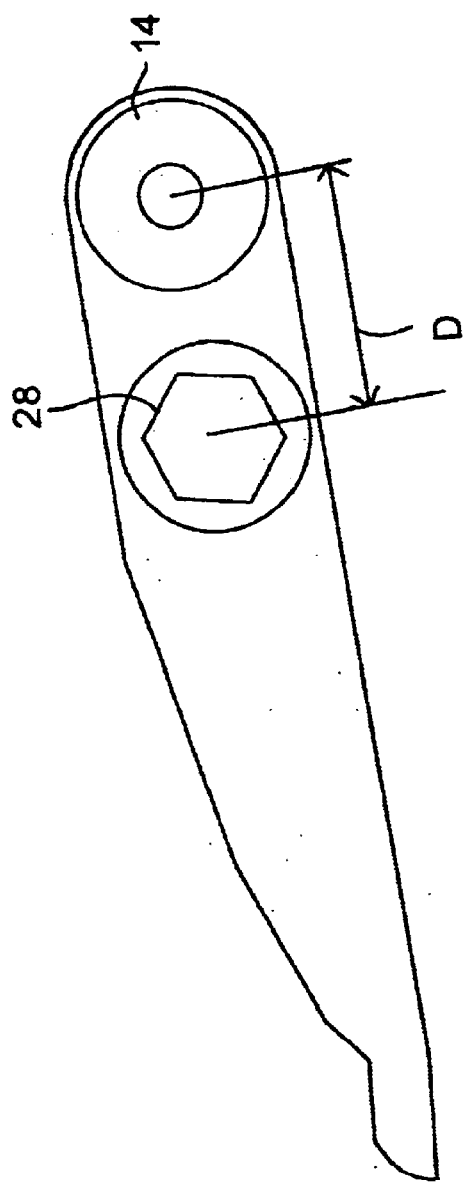
FIG. 3
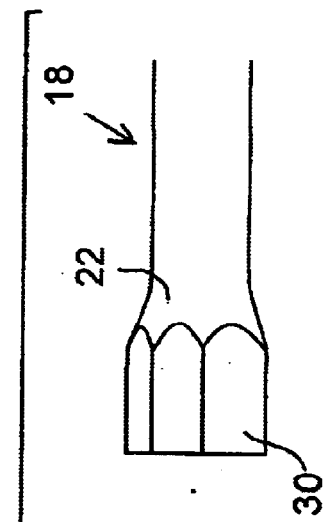
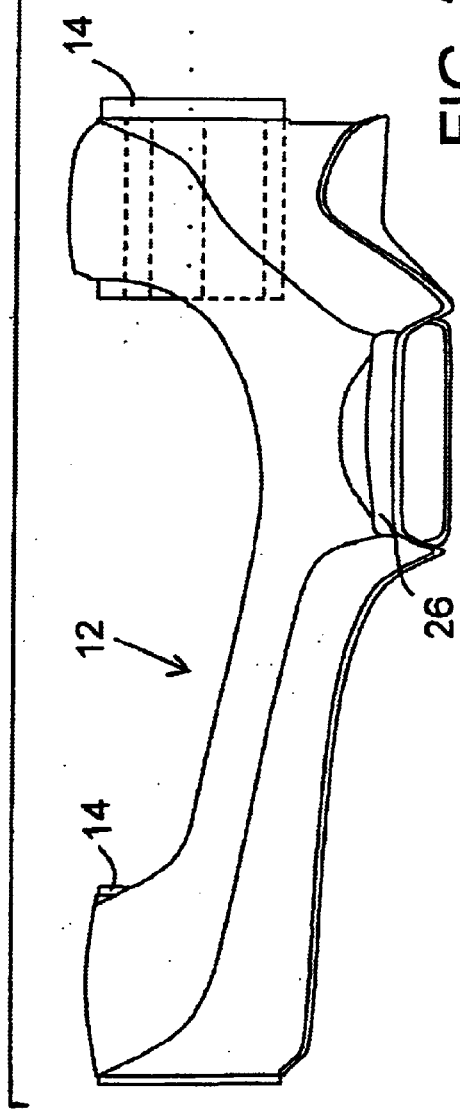
FIG. 2 (PRIOR ART)

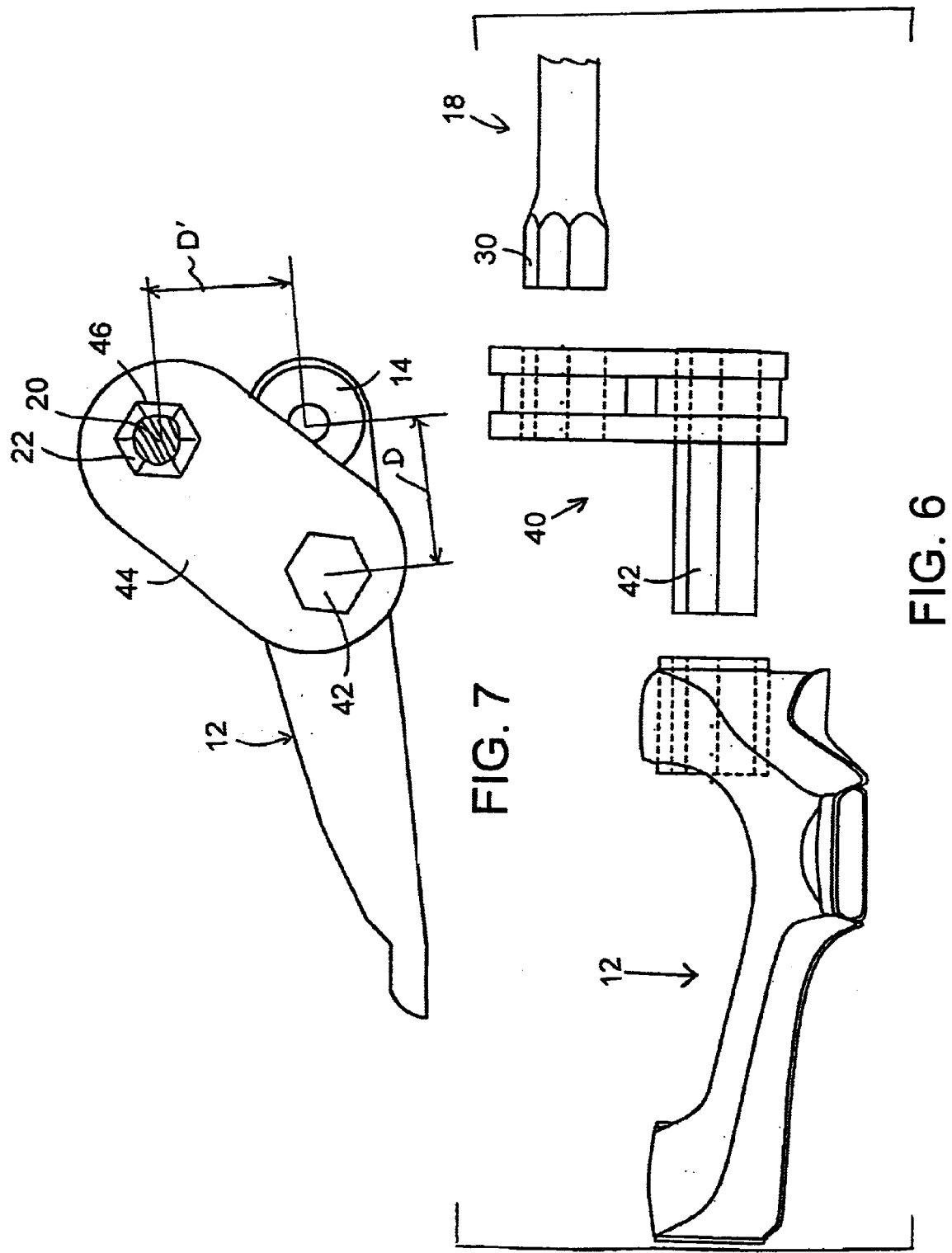

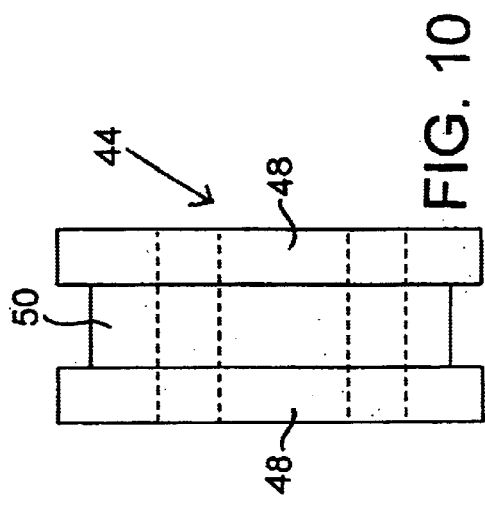
FIG. 10
FIG. 9
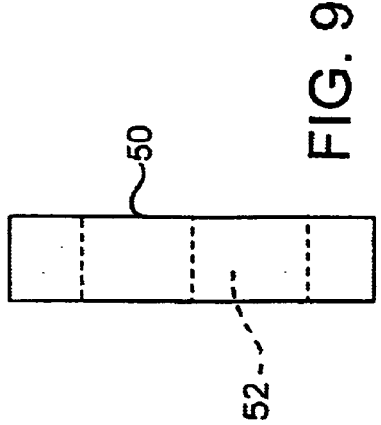
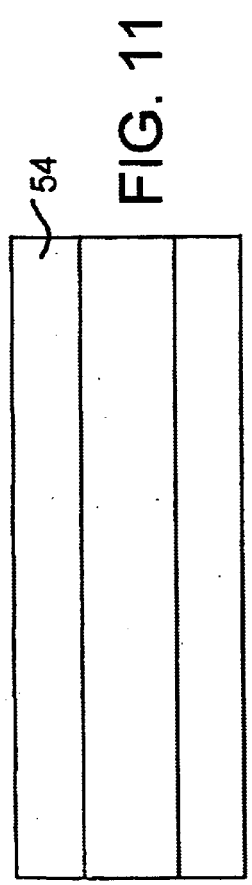
FIG. 11
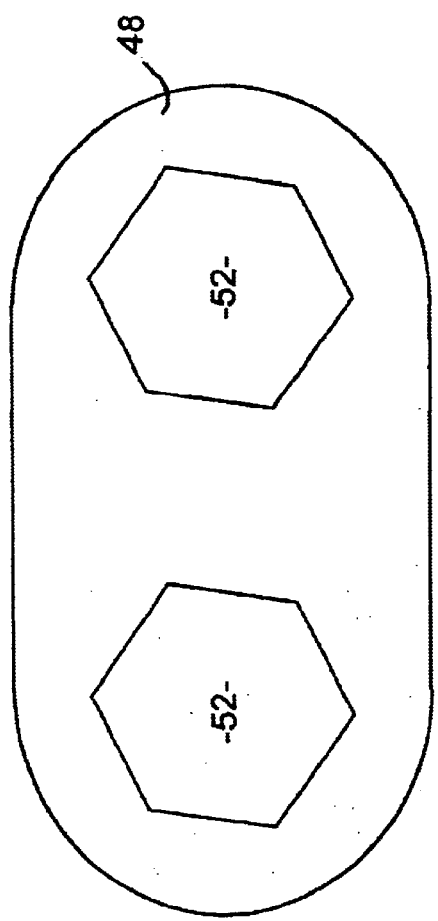
FIG. 8

TORSION-BAR RELOCATION DEVICE

BACKGROUND OF THE INVENTION

1. Field of the Invention

This invention is related in general to the field of automotive accessories and, in particular, to a coupling device for relocating the point of connection between the A-arm and the torsion bar of a truck that has been lifted to provide greater undercarriage clearance.

2. Description of the Related Art

As illustrated FIG. 1, in conventional front-end suspensions of small trucks and pick-ups, each front wheel is connected through a ball joint 10 to a shock-absorbed, torque-loaded A-arm 12 on each side of the vehicle. The A-arm 12 is pivotally attached through bushings 14 to the frame 16 of the vehicle and to a torsion bar 18 that provides a torque that stabilizes the wheel assembly in a desirable, predetermined position under load. The torsion bar consists of a long metal shaft 20 that has one end (not shown) held rigidly in the frame of the vehicle and the other end 22 twisted and attached to the A-arm 16 through a rigid socket connection 24 to act as a spring. Thus, as the A-arm pivots up or down around the bushings 14 in response to forces exerted on the front wheels of the vehicle, the torsion bar 18 urges the entire wheel assembly to its static, predetermined position by applying a torque to the A-arm.

Because small trucks are often used for off-road driving, it is very desirable that the clearance below the undercarriage of the vehicle be as large as possible. Accordingly, it has become common practice for owners of these vehicles to increase such clearance by using larger-aspect tires and elevating the frame with respect to the wheels. This is typically accomplished using after-market kits that provide additional ground clearance by relocating various undercarriage components to a higher position relative to the wheels. When this is done, the back end of the torsion bar 18 is stretched upward, changing its position in relation to the A-arm 12 and correspondingly introducing an undesirable variation in the torsional effect of the torsion bar. In order to avoid this problem, these kits often include an attachment for anchoring the back end of the torsion bar several inches below its original position in the undercarriage point, thereby retaining the original angle of the front end 22 of the torsion bar in relation to the A-arm. This approach solves the torsion-bar performance problem, but it reduces the additional clearance provided by the lift operation.

Therefore, it would be very desirable to be able to relocate the A-arm end 22 of the torsion bar 18 so as to also offset its position relative to ground, such as to maintain its functional integrity and also afford further clearance for the vehicle's undercarriage. This invention provides a simple device for accomplishing this goal.

BRIEF SUMMARY OF THE INVENTION

The invention is directed at an after-market accessory for use in conjunction with commercial lift kits employed to increase the undercarriage clearance of small trucks. The main objective of the invention is a coupling device for relocating the position of the front end of the torsion bar relative to ground, after the undercarriage of the truck has been lifted with such a lift-kit, in order to retain the functional characteristics of the torsion bar.

Another goal of the invention is a device that provides additional ground clearance for the vehicle's undercarriage.

Another objective is device in the form of a kit that is adaptable for use with any conventional pick-up truck in conjunction with a corresponding lift kit.

Another goal is a kit suitable for assembly by the average vehicle owner without the need for special tools or expertise.

A final objective is a device that can be manufactured and marketed economically and directly to the general public as an after-market product in the automotive industry.

Therefore, according to these and other objectives, the invention consists of an accessory for coupling the A-arm of a vehicle to its torsion bar through a rigid member that relocates the relative position of the two components by a predetermined offset distance that raises the torsion bar with respect to the ground. As a result, the position of the torsion bar is elevated and the ground clearance of the vehicle's undercarriage is increased.

According to another aspect of the invention, by rigidly positioning the coupling mechanism between the A-arm and the torsion bar so that the distance of the point of attachment from the A-arm's pivot point in the frame remains substantially the same, the torsional effect of the torsion bar is retained without material change. Therefore, the safety and driving characteristics of the vehicle are not noticeably altered.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

BRIEF DESCRIPTION OF THE DRAWINGS

FIG. 2 is an elevational view of a conventional A-arm and a torsion bar shown apart in a disassembled condition.

FIG. 3 is a side view of the A-arm of FIG. 2.

FIG. 6 is an elevational view, in disassembled condition, of the coupling device of the invention shown between the conventional A-arm and torsion bar of FIG. 2.

FIG. 7 is a side view of the components of FIG. 6.

FIGS. 8–11 are elevational views of various components used to manufacture a coupling device according to the invention.

DESCRIPTION OF THE PREFERRED EMBODIMENTS OF THE INVENTION

Figure 1:
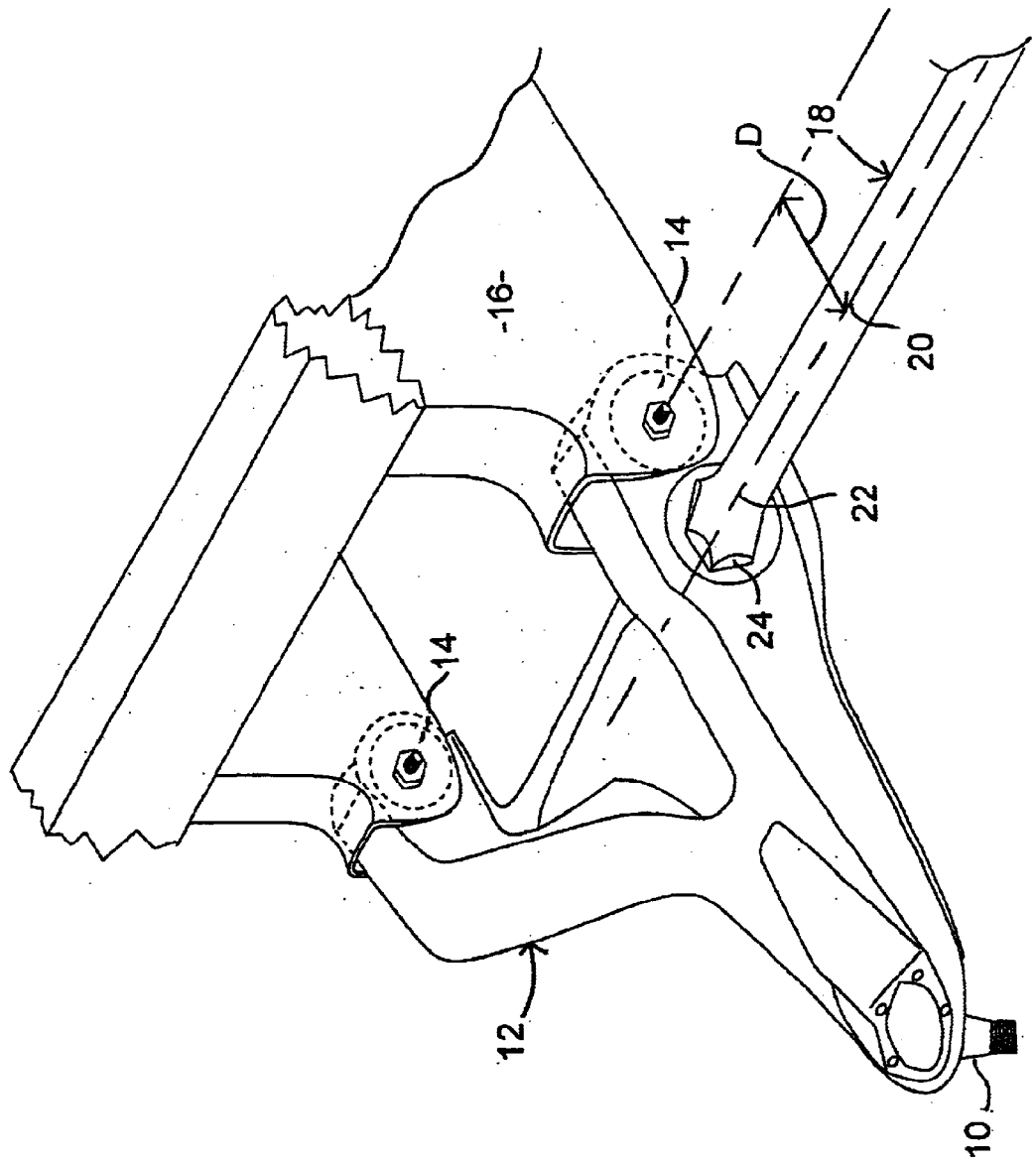
FIG. 1 is a perspective view of a conventional A-arm assembly, showing the forward end of a torsion bar attached to the A-arm by means of a rigid socket connection.

The present invention lies in the idea of maintaining the functional characteristics of a torsion bar while also improving the clearance afforded by a vehicle lift kit by providing an accessory that elevates the position of the front end of the vehicle's torsion bars by a predetermined distance. Referring to the drawings, wherein like parts are designated throughout with like numerals and symbols, FIG. 2 illustrates in elevational view an A-arm 12 and a torsion bar 18 of a standard vehicle front-wheel assembly in disassembled condition. FIG. 3 is a side view of the A-arm 12. As mentioned with respect to FIG. 1, the A-arm 12 is pivotally connected to the frame of the vehicle through two bushings 14 that are substantially aligned on a horizontal plane and parallel to the main axis of the vehicle. Each front wheel of the vehicle is coupled to the outer portion 26 of the A-arm through a ball joint 10 (FIG. 1), so that vertical components of forces exerted on the wheels cause the A-arm to swing up or down around the bushings 14. In order to provide a stable predetermined rest position for the A-arm 12 (and correspondingly for the entire wheel assembly), the back end of the torsion bar 18 is rigidly attached to the frame of the vehicle and its front end 22 is coupled to the A-arm 12. Typically, the two components are firmly connected by means of a hexagonal socket 28 in the A-arm and a conforming hex head 30 in the torsion bar 12. After the torsion bar has been assembled to the A-arm, as shown in FIG. 1, it is twisted by a predetermined angle in order to provide a torsional effect on the A-arm according to design criteria selected to optimize driving performance and safety. As is well understood by those skilled in the art, the effect of the torsion bar on the A-arm is related to the offset distance D between the centers of the socket 28 and the pivot bushing 14, which constitutes a lever arm for the force applied by the torsion bar.

Figure 4:
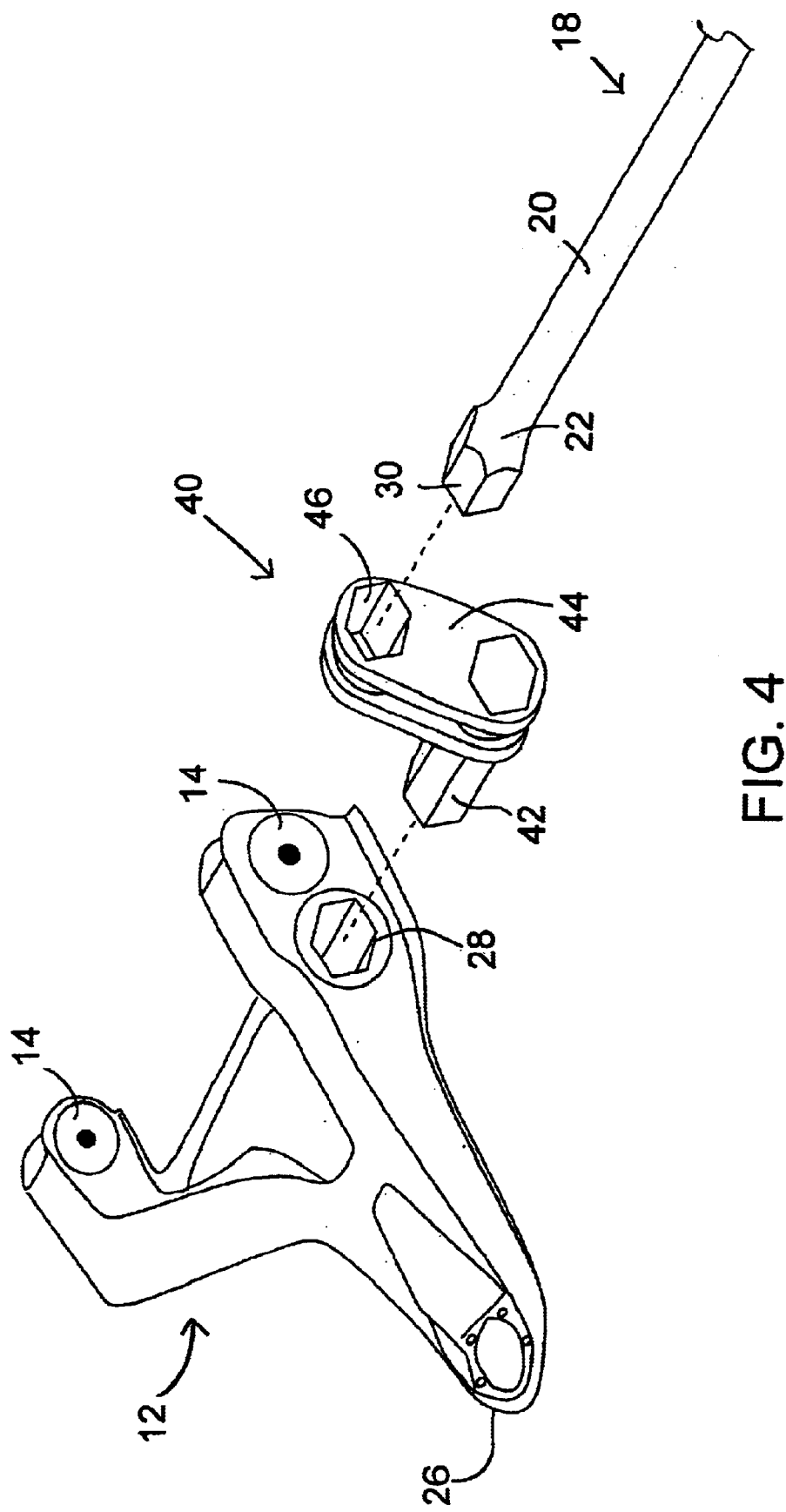
FIG. 4 is an exploded perspective view of the components of the invention showing a conventional A-arm assembly, a coupling device, and the forward end of a torsion bar.
Figure 5:
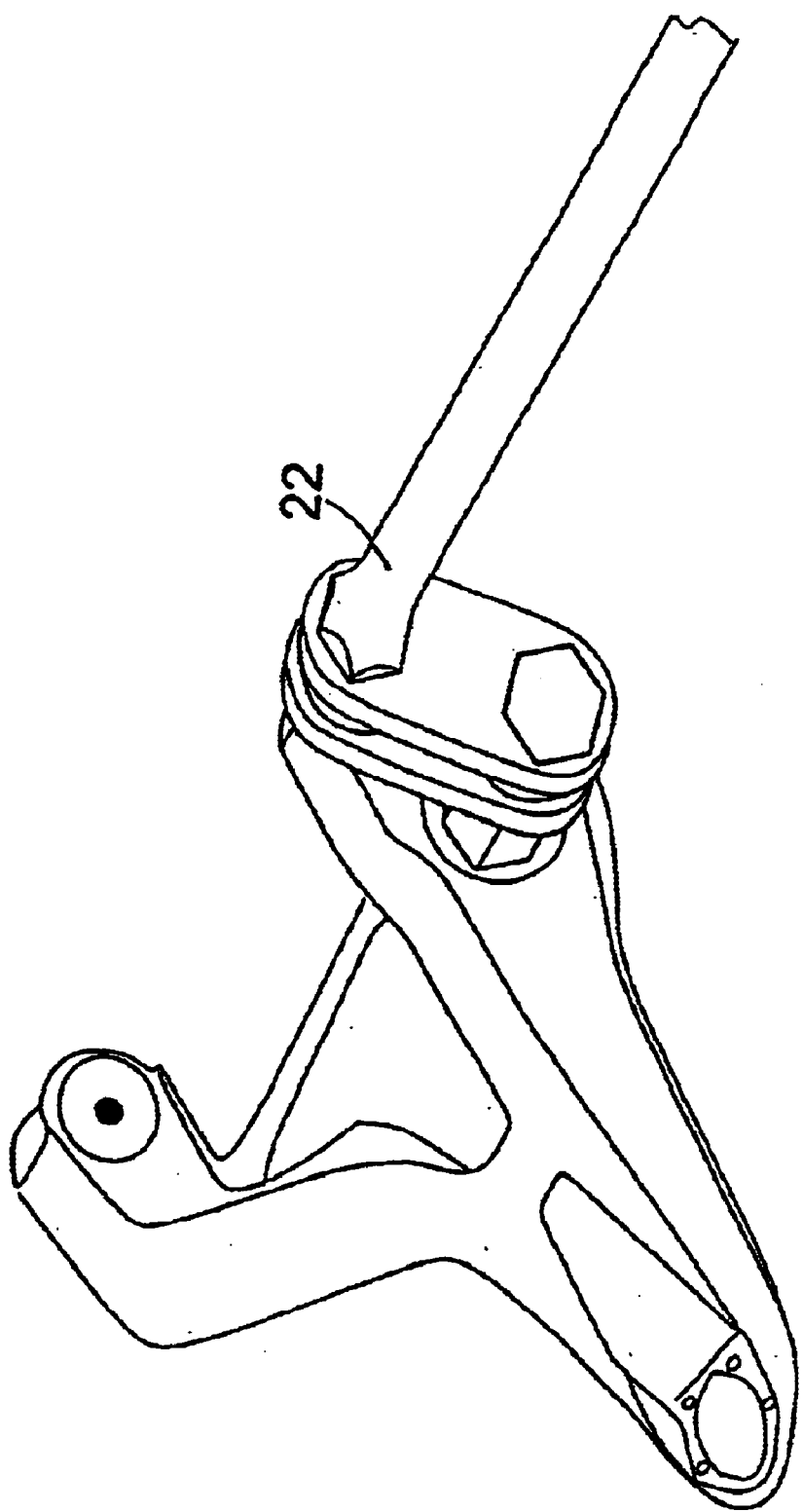
FIG. 5 is a perspective view of the components of the invention after assembly.

According to the invention, illustrated in FIG. 4, a coupling device 40 is provided for connection between the A-arm and the torsion bar such that the front end 22 of the torsion bar is relocated upward with respect to its original position. As a result of this relocation, the shaft 20 of the torsion bar is elevated and more ground clearance is provided for the vehicle. The coupling device 40 includes a hexagonal coupling head 42 (substantially identical to the torsion-bar head 30) for mating with the socket 28 of the A-arm 12. The head 42 is attached to one end of an offset member 44, which has a predetermined length designed to elevate the front end 22 of the torsion bar 18 by an amount substantially equivalent to the vertical displacement expected to be introduced in the back end of the torsion bar by lift kit used to elevate the undercarriage. Finally, a coupling socket 46 in the member 44 conforms to the torsion-bar head 30 for rigid engagement therewith. After assembly of the coupling device 40 between the A-arm and the torsion bar of the vehicle, the front end 22 of the torsion bar is displaced upward and the original position of the torsion bar relative to the frame is reestablished, as illustrated in FIG. 5.

According to an aspect of the invention, the A-arm 12, the coupling device 40, and the torsion bar 18, shown in exploded view in FIG. 6, may be assembled in a relative position designed to maintain the approximate distance of the torsion bar to the pivot axis of the A-arm. As illustrated in the side elevational view of FIG. 7, the original distance D can be retained by attaching the offset member 44 to the A-arm 12 at the appropriate angle to produce a distance D' between the bushing 14 and the coupling socket 46 equal to the distance D. As a result, the torsional effect of the torsion bar 18 is substantially the same as before the installation of the lift kit that the present invention is designed to complement. It is noted, though, that the distance D' also determines the amount of vertical lift provided to the front end 22 of the torsion bar, which may be different from the vertical displacement introduced by the lift kit to the back end of the torsion bar. Therefore, a judiciously selected compromise may be necessary. Nevertheless, I found that many commercially available lift kits provide a vertical displacement that is comparable to the distance D.

It is understood that the coupling device of the invention needs to be adapted for the particular vehicle for which it is intended. The same is obviously true for the corresponding lift kit. Accordingly, the precise shape and size of the coupling head 42 is determined by the head 30 of the torsion bar which it is replacing in the socket 28 of the A-arm. The shape of the coupling socket 46 is obviously determined by the same criterion. Similarly, the center-to-center distance between the coupling head 42 and the coupling socket 46 in the offset member 44 is determined by a trade-off between the amount of vertical lift deemed desirable for the torsion bar and the distance D' deemed acceptable for performance. For example, I found that a coupling device having a hex head 42 and a hex socket 46 of 1½ inches, disposed 2¾ inches apart (center to center), fits all Chevrolet® S-10 and GMC® S-15 trucks. Similarly, a coupling device having a hex head and a hex socket of ⅝ inches, disposed 2¾ inches apart (center to center), fits all Chevrolet® trucks of Series C-1500 to C-3500.

FIGS. 8–11 illustrate a simple and inexpensive way to manufacture the coupling device 40 of the invention. The offset member 44 can be produced by cutting two equal pieces 48 (FIG. 8) and a spacer 50 (FIG. 9) from a metal plate. openings 52 are provided to match the desired geometry of the coupling head 42 and the socket 46 (shown as hexagonal). The three pieces are then combined with openings 52 in alignment to form the offset member 44 (FIG. 10). Finally, a rod 54 with a cross-section conforming to the geometry of the openings 52 (FIG. 11) is provided and inserted through one set of openings 52 in the offset member 44 to form a coupling device according to the invention.

Various changes in the details, steps and components that have been described may be made by those skilled in the art within the principles and scope of the invention herein illustrated and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

I claim:

1. A device for varying a position with respect to ground of a torsion bar attached to an A-arm in a vehicle while maintaining a rigid connection therebetween, comprising:

an offset member;

first coupling means for rigidly attaching a first side of the offset member to the A-arm from a back side of the A-arm facing the torsion bar; and second coupling means for rigidly attaching a second side of the offset member to a front end of the torsion bar;

wherein said first and second sides of the offset member are attached to the A-arm from said back side of the A-arm and to the front end of the torsion bar, respectively, in various positions that produce corresponding displacements of the torsion bar with respect to ground.

2. The device of claim 1, wherein said first coupling means comprises a coupling head conforming to a socket in said back side of the A-arm facing the torsion bar, and said second coupling means comprises a coupling socket conforming to a head in the front end of the torsion bar.

3. The device of claim 2, wherein said coupling head and coupling socket are hexagonal.

4. The device of claim 3, wherein said coupling head and coupling socket are spaced approximately 2¾ inches apart.

5. The device of claim 4, wherein said coupling head and coupling socket are 1½ inches in size.

6. The device of claim 4, wherein said coupling head and coupling socket are ⅝ inches in size.

7. The device of claim 2, wherein said offset member comprises a metal plate cut to form a first opening adapted to receive said first coupling means and a second opening adapted to provide said coupling socket, and wherein said first coupling means includes said coupling head conforming to a socket in the A-arm.

8. The device of claim 1, wherein said first and second coupling means are spaced apart a distance adapted to produce a predetermined vertical displacement of said front end of the torsion bar.

9. An A-arm assembly for varying a position respect to ground of a torsion bar attached to an A-arm in a vehicle while maintaining a rigid connection therebetween, comprising:

an A-arm;

a torsion bar with a front end adapted for rigid connection to the A-arm;

an offset member;

first coupling means for rigidly attaching a first side of the offset member to the A-arm from a back side of the A-arm facing the torsion bar in replacement of said front end of the torsion bar; and second coupling means for rigidly attaching a second side of the offset member to the front and of the torsion bar;

wherein said first and second sides of the offset member are attached to the A-arm from said back side of the A-arm and to the front end of the torsion bar, respectively, in various positions that produce corresponding displacements of the torsion bar with respect to ground.

10. The device of claim 9, wherein said first coupling means comprises a coupling head conforming to a socket in said back side of the A-arm facing the torsion bar, and said second coupling means comprises a coupling socket conforming to a head in the front end of the torsion bar.

11. The device of claim 10, wherein said coupling head and coupling socket are hexagonal.

12. The device of claim 11, wherein said coupling head and coupling socket are spaced approximately 2¾ inches apart.

13. The device of claim 12, wherein said coupling head and coupling socket are 1½ inches in size.

14. The device of claim 13, wherein said coupling head and coupling socket are ⅝ inches in size.

15. The device of claim 10, wherein said offset member comprises a metal plate cut to form a first opening adapted to receive said first coupling means and a second opening adapted to provide said coupling socket, and wherein said first coupling means includes said coupling head conforming to a socket in the A-arm.

16. The device of claim 9, wherein said first and second coupling means are spaced apart a distance adapted to produce a predetermined vertical displacement of said front end of the torsion bar.

17. The device of claim 9, wherein said first and second coupling means are positioned at approximately the same distance from a pivot axis of said A-arm.

18. A method for varying a position with respect to ground of a torsion bar attached to an A-arm in a vehicle where a front end of the torsion bar is rigidly connected to the A-arm from a back side of the A-arm facing the torsion bar, and maintaining a rigid connection therebetween, the method comprising the following steps:

providing an offset member;

attaching a first coupling means of the offset member to the A-arm in replacement of said front end of the torsion bar; and attaching a second coupling means of the offset member to the front end of the torsion bar;

wherein said first and second sides of the offset member are attached to the A-arm from said back side of the A-arm and to the front end of the torsion bar, respectively, in various positions that produce corresponding displacements of the torsion bar with respect to ground.

19. The method of claim 18, wherein said first and second coupling means are spaced apart a distance adapted to produce a predetermined vertical displacement of said front end of the torsion bar.

20. The method of claim 18, wherein said first and second coupling means are positioned at approximately the same distance from a pivot axis of said A-arm.

* * * * *